(12) United States Patent
Haik et al.

(10) Patent No.: US 9,697,374 B2
(45) Date of Patent: Jul. 4, 2017

(54) DATA PROXY SERVICE

(71) Applicant: MICROSOFT TECHNOLOGY LICENSING, LLC, Redmond, WA (US)

(72) Inventors: Fadi Haik, Shfaram (IL); Nadav Bar, Tel Aviv (IL)

(73) Assignee: Microsoft Technology Licensing, LLC, Redmond, VA (US)

( * ) Notice: Subject to any disclaimer, the term of this patent is extended or adjusted under 35 U.S.C. 154(b) by 344 days.

(21) Appl. No.: 14/183,849

(22) Filed: Feb. 19, 2014

(65) Prior Publication Data
US 2015/0235043 A1 Aug. 20, 2015

(51) Int. Cl.
G06F 21/00 (2013.01)
G06F 21/62 (2013.01)
G06F 9/445 (2006.01)

(52) U.S. Cl.
CPC ............ G06F 21/6218 (2013.01); G06F 8/60 (2013.01); G06F 21/6245 (2013.01)

(58) Field of Classification Search
CPC ..... G06F 21/6218; G06F 21/6245; G06F 8/60
USPC .......................................................... 726/27
See application file for complete search history.

(56) References Cited

U.S. PATENT DOCUMENTS 6,308,275 B1 * 10/2001 Vaswani ................. G06F 21/53
726/2
8,607,067 B1 * 12/2013 Janse van Rensburg ............ H04L 63/0823
713/189

2002/0188649 A1  12/2002 Karim
2009/0210631 A1 * 8/2009 Bosworth ............... H04L 67/10
711/141
2010/0287472 A1  11/2010 Eversole et al.
2012/0209923 A1  8/2012 Mathur et al.
(Continued)

FOREIGN PATENT DOCUMENTS

WO  2012109512 A1  8/2012

OTHER PUBLICATIONS

"International Search Report and Written Opinion Issued in PCT Application No. PCT/US2015/015298", Mailed Date: Aug. 17, 2015, 11 Pages.

(Continued)

*Primary Examiner* — Mahfuzur Rahman
(74) *Attorney, Agent, or Firm* — Shook, Hardy & Bacon L.L.P.

(57) ABSTRACT

One or more techniques and/or systems are provided for deploying an application according to a data access profile used to sandbox the application. For example, an event planner app may be identified for download from an app store. A deployment mock data configuration interface may be presented to a user prior to or as a preliminary operation of downloading and/or installing the event planner app. A data access profile, specifying that the event planner app has access to user age data, but is blocked from accessing user phone number data, for example, may be received through the deployment mock data configuration interface. The event planner app may thus be deployed in a sandbox mode on the device based upon the data access profile (e.g., real age data may be provided to the event planner app whereas mock phone number data may be provided to the event planner app).

20 Claims, 9 Drawing Sheets

(56) References Cited

U.S. PATENT DOCUMENTS

| | | | | |
|---|---|---|---|---|
| 2013/0014212 | A1* | 1/2013 | Cohen | G06F 21/629 |
| | | | | 726/1 |
| 2013/0097706 | A1* | 4/2013 | Titonis | G06F 21/56 |
| | | | | 726/24 |
| 2013/0239192 | A1* | 9/2013 | Linga | G06F 21/44 |
| | | | | 726/7 |
| 2014/0304505 | A1* | 10/2014 | Dawson | G06F 21/6227 |
| | | | | 713/165 |
| 2014/0372975 | A1* | 12/2014 | Chandaria | G06F 8/34 |
| | | | | 717/109 |

OTHER PUBLICATIONS

Tufts, Andrew, "Next CyanogenMod Update Will Include Incognito Mode for All Apps", Published on: Jun. 13, 2013, pp. 5, Available at: http://www.oneclickroot.com/root-android/next-cyanogenmod-update-will-include-incognito-mode-for-all-apps/.

Ion, Florence, "How CyanogenMod's Founder is Giving Android Users their Privacy Back", Published on: Jun. 18, 2013, pp. 7 Available at: http://arstechnica.com/gadgets/2013/06/how-cyanogenmods-founder-is-giving-android-users-their-privacy-back/.

Cooley, Brett, "Metis: Mocking Data for Usability & Privacy", In Proceedings of the Thesis of the Bachelor of Science with Honors in Computer Science, May 2, 2013, 26 pages, https://digitalarchive.wm.edu/bitstream/handle/10288/18165/CooleyBrett2013.pdf?sequence=1.

Zhou, et al., "Taming Information-Stealing Smartphone Applications (on Android)", In Proceedings of the 4th International Conference on Trust and Trustworthy Computing, Jun. 2011, 15 pages, http://www.cs.ncsu.edu/faculty/jiang/pubs/TRUST11.pdf.

Beresford, et al.,"MockDroid: Trading Privacy for Application Functionality on Smartphones", In Proceedings of the 12th Workshop on Mobile Computing Systems and Applications, Mar. 1, 2011, 6 pages, http://www.cl.cam.ac.uk/~acr31/pubs/beresford-mockdroid.pdf.

"Testing Using Mock Locations", Retrieved on: Nov. 25, 2013, pp. 8 Available at: http://developer.android.com/training/location/location-testing.html.

"Google Chrome Privacy Notice", Retrieved on: Nov. 25, 2013, pp. 10 Available at: http://www.google.co.in/intl/en/chrome/browser/privacy/.

Henry, Alan, "PDroid Gives You Control Over the Personal Information Your Android Apps Can Access", Published on: Sep. 12, 2011, pp. 3 Available at: http://lifehacker.com/5866597/pdroid-gives-you-control-over-the-personal-information-your-android-apps-can-access.

"International Preliminary Report on Patentability Issued in PCT Application No. PCT/US2015/015298", Mailed Date: Jan. 20, 2016, 7 Pages.

* cited by examiner

DATA PROXY SERVICE

BACKGROUND

Many applications, websites, and/or services utilize user data for various purposes. In an example, a social network app may utilize a current location of a mobile device to tag a user post with a location. In another example, an internet phone service may import a user contact list into an address book. In this way, applications, websites, and/or services may access user data for normal operation and/or for supplemental functionality.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for deploying an application according to a data access profile used to sandbox the application are provided herein. In an example, an application may be identified for deployment on a device associated with a user. For example, a social network app may be identified for acquisition from an app store (e.g., for downloading to the device) and/or for installation on the device. A deployment mock data configuration interface may be presented to the user. For example, the deployment mock data configuration interface may be integrated into the acquisition and/or installation of the application (e.g., an operating system may incorporate/integrate the deployment mock data configuration interface into the installation process for the application such as into an installation interface; the app store may incorporate/integrate the deployment mock data configuration interface into a download process for the application such as into a download interface; etc.).

A data access profile for the application may be received though the deployment mock data configuration interface. For example, the data access profile may specify that the social network app has access to a first data type of user data (e.g., user photo data having a user photo data type). The data access profile may specify that the social network app is to receive mock data for a second data type of user data (e.g., the social network app may be provided with a mock work contact list, such as a fake contact list, as opposed to being provided with access to a work contact list having a work contact data type). The data access profile may specify that the social network app is to be blocked from accessing user data of the second data type. The application may be deployed (e.g., downloaded and/or installed) in a sandbox mode (e.g., data requests from the social network app may be intercepted and/or filtered based upon the data access profile) on the device based upon the data access profile. Because the data access profile is applied before and/or during deployment of the application for sandboxing the application (e.g., as opposed to sandboxing the application after installation), instances where the application is deployed on the device with undesirable access to user data before being blocked are mitigated.

In an example, a data request may be intercepted from the social network app. The data request may request access to first user data. The data access profile, used to sandbox the social network app, may be identified. Responsive to determining that the first user data corresponds to the first data type (e.g., the data request may request access to user photo data), the social network app may be provided with the first user data based upon the data access profile. Responsive to determining that the first user data corresponds to the second data type (e.g., the data request may request access to the work contact list), the social network app may be provided with first mock data (e.g., the mock work contact list) based upon the data access profile.

Providing the application with the first mock data, such as the mock work contact list, allows the application to operate normally because the application has mock work contact data with the work contact data type (e.g., the application may be expecting data with the work contact data type), while preserving privacy of the work contact list. In this way, the user may create and/or configure data access profiles for various applications, websites, and/or services at a relatively detailed level of granularity (e.g., the user may specify a mock/fake value for mock data provided in place of user data). In an example, a data proxy service component may be implemented on the user device for deploying applications according to a data access profile used to sandbox the applications (e.g., the data proxy service component may be transparent or hidden to the application, and thus may intercept application programming interface (API) calls by the application). In another example, the data proxy service component may be implemented by a server for selectively providing data to applications (e.g., API calls and/or other data requests may be routed through the data proxy service component hosted on the server).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
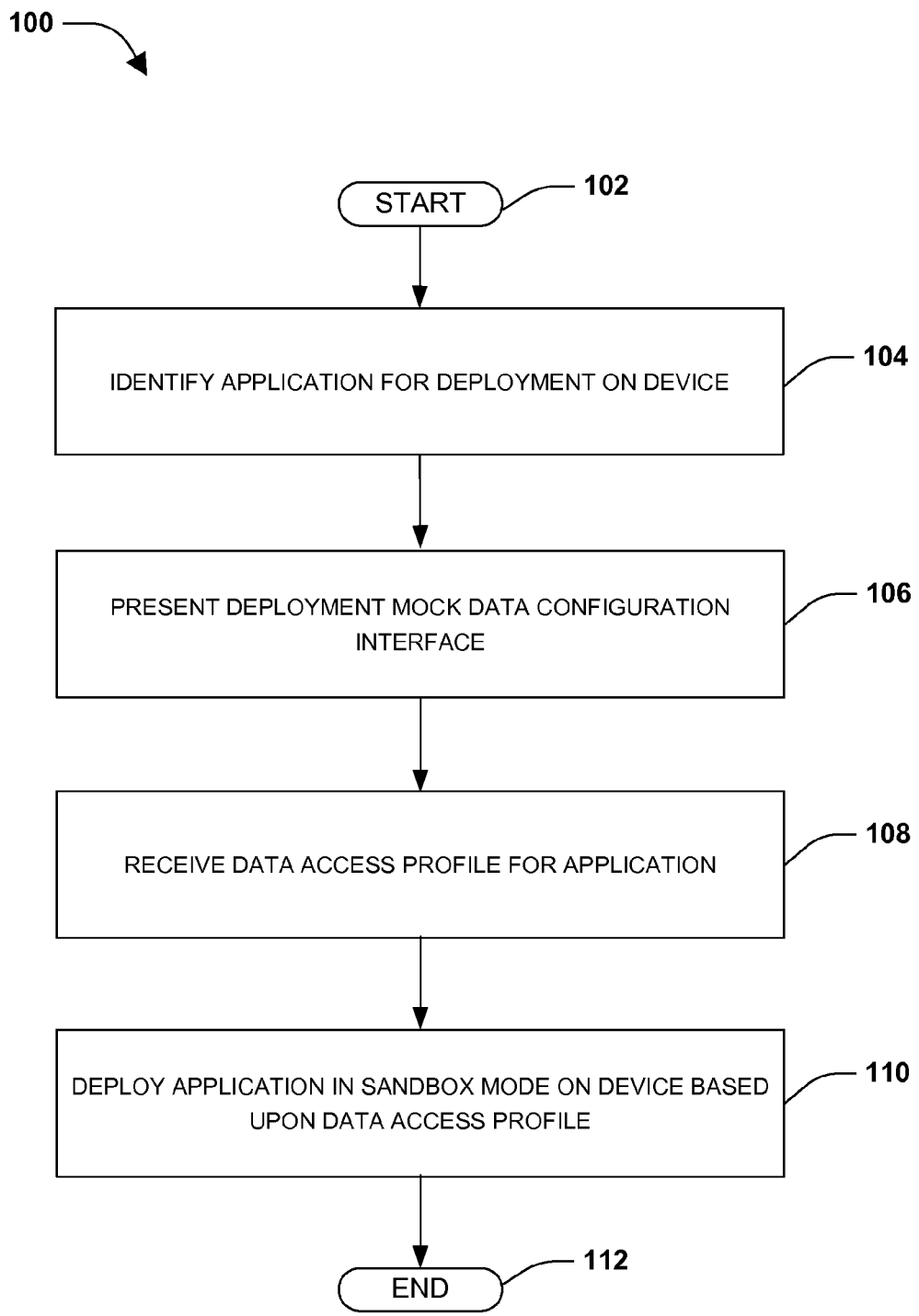
FIG. 1 is a flow diagram illustrating an exemplary method of deploying an application according to a data access profile used to sandbox the application.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for deploying an application according to a data access profile used to sandbox the application are provided. In an example, a user may create and/or configure data access profiles for applications, websites, and/or services. For example, the user may install an internet phone app on a mobile device to try out and/or test the internet phone app. Because the internet phone app may have been provided by a source unknown to the user (e.g., published through an app store by a company unknown to the user), the user may create a data access profile for the internet phone app before and/or during deployment of the internet phone app. The user may specify user specified access rules for the internet phone app. For example, the user may specify that the internet phone app is allowed to access user location data on the mobile device, but that the internet phone app is to be provided with mock contact data (e.g., a mock/fake contact made up by the user, randomly generated, or a default mock/fake value) because the user does not yet trust the internet phone app and thus does not want to provide the internet phone app with access to user contact data on the mobile device. The internet phone app may be deployed in a sandbox mode on the device based upon the data access profile, such that the internet phone app is restricted from accessing user data other than as specified by a data access profile for the internet phone app. In this way, the user may selectively protect user data from particular applications, while still providing applications with mock data so that such applications may continue normal operation by receiving data having an expected type (e.g., the mock data may have a similar data type as user data).

An embodiment of deploying an application according to a data access profile used to sandbox the application is illustrated by an example method 100 of FIG. 1. At 102, the method starts. At 104, an application may be identified for deployment on a device associated with a user (e.g., for download from an app store to the device and/or for installation on the device). For example, a user may initiate installation of an event planner app on the device. At 106, a deployment mock data configuration interface may be presented to the user. For example, the deployment mock data configuration interface may be incorporated into an installation process for the event planner app (e.g., an operating system installation API may integrate the deployment mock data configuration interface into an installation interface for the event planner app). The deployment mock data configuration interface may be populated with a variety of data types for which the user may selectively allow access to user data, block access to user data, and/or specify mock data to substitute for user data.

At 108, a data access profile for the application may be received through the deployment mock data configuration interface. The data access profile may specify that the event planner app has access to a first data type of user data (e.g., user contact data having a contact data type). The data access profile may specify that the event planner app is to be blocked from accessing a second data type of user data (e.g., user age data having an age data type). The data access profile may specify that the event planner app is to receive mock data for the age data type (e.g., a mock age value comprising a user specified fake age value such as "99", a randomly generated age value such as "55", a default value such as "18", a modification of real user data "a current age plus 10 years", and/or any other data that is different than a real age of the user).

At 110, the application may be deployed in a sandbox mode on the device based upon the data access profile. In this way, security of user data may be improved because the event planner app may be sandboxed according to the data access profile (e.g., data requests from the event planner app may be intercepted and/or filtered) before the event planner app is installed on the device. Otherwise, the event planner app may have undesirable access to user data where the event planner app is sandboxed after installation (e.g., such as by a third party app).

In an example of sandboxing the application, a data request may be intercepted from the event planner app executing in the sandbox mode. For example, a private data proxy service, hidden from the application, may intercept an application programming interface (API) call comprising the data request. The data request may request access to first user data (e.g., contact data, social network data, browsing history data, user file data, user profile data, financial data, health data, subscription data, personal data, network access, email access, cellular data access, and/or a variety of other user data). The data access profile, used to sandbox the event planner app, may be identified (e.g., the private data proxy service may utilize an application identifier, within the API call, to query a profile repository to identify the data access profile).

Responsive to determining that the first user data corresponds to the first data type (e.g., the data request may request access to the user contact data having the contact data type), the event planner app may be provided with the first user data based upon the data access profile (e.g., a contact list API call to a contact list data provider may be forwarded from the private data proxy service to the contact list data provider so that the contact list data provider may provide contact list user data to the event planner app). In an example, the data access profile may specify that the application has access to the first user data merely based upon a determination that no user access rule has been specified for the first user data (e.g., a determination that the data access profile lacks an entry the first user data). Responsive to determining that the first user data corresponds to the second data type (e.g., the data request may request access to the user age data having the age data type), the event planner app may be provided with first mock data (e.g., the mock age value) based upon the data access profile. Because the first mock data may have a mock value (e.g., a randomly generated value, a default value, or user specified value of "99") that is different than a user value (e.g., the real age of the user specified within a user profile), the user age data is kept private from the event planner app. Because the first mock data and the first user data have the same data type, such as the age data type, the event planner app may continue operation without being blocked from accessing data used for normal operation (e.g., because the event planner app may expect a return value having the age data type, the event planner app may utilize the mock value of "99" having the age data type).

After deployment of the application, the data access profile may be dynamically updated. In an example, the user may dynamically update the data access profile on-demand based upon an on-demand update (e.g., after creation of the data access profile, after installation of the application, during execution of the application, etc.). In another example, a data access reconfiguration interface may be exposed to the user. A user specified access rule for the application may be received through the data access reconfiguration interface (e.g., the user may specify that the event planner app is to be blocked from accessing work contact data having a work contact data type, and thus mock work contact data may be provided in-place of the work contact data). The data access profile for the event planner app may be reconfigured based upon the user specified access rule. At 112, the method ends.

Figure 2:
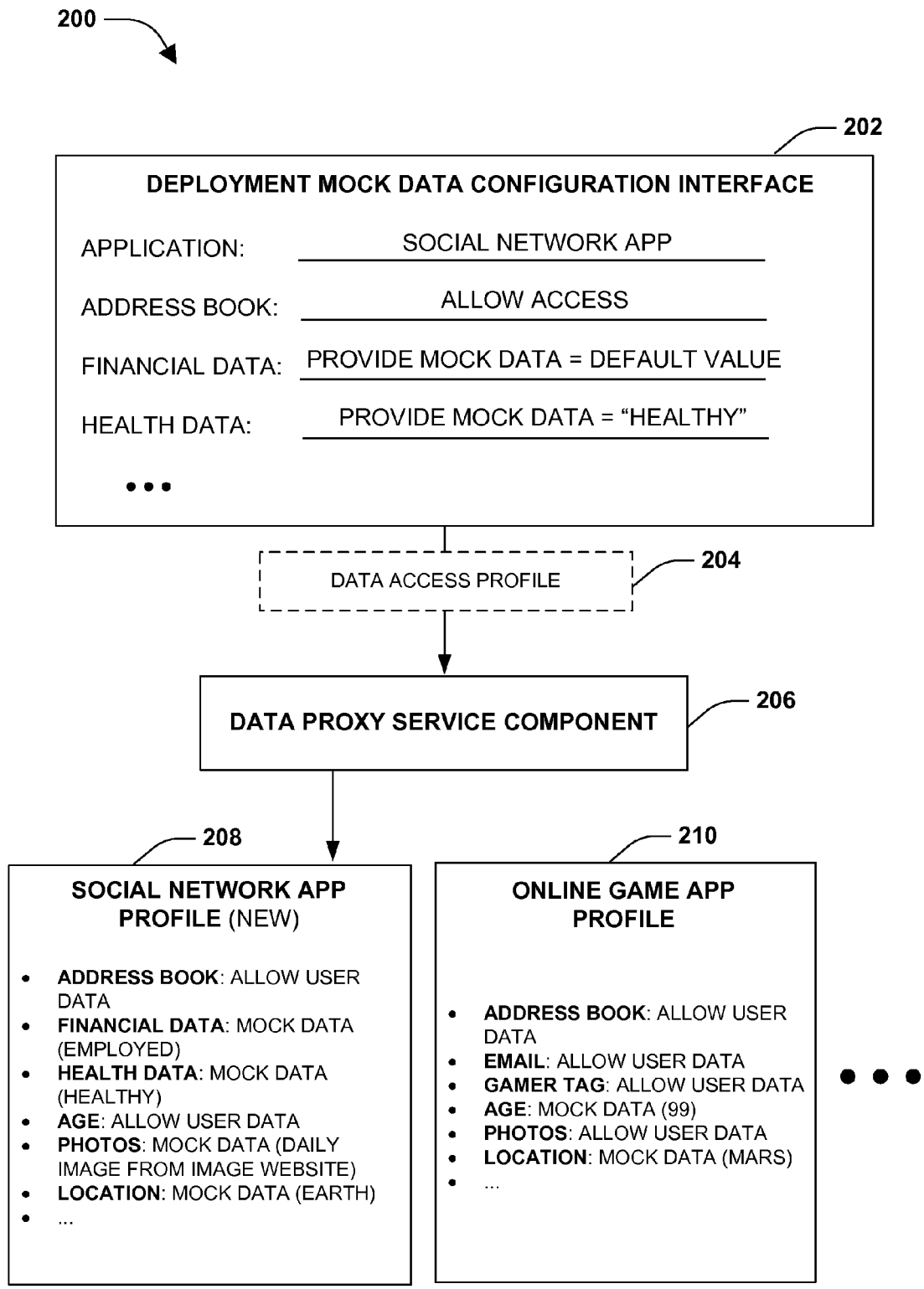
FIG. 2 is a component block diagram illustrating an exemplary system for creating and/or maintaining one or more data access profiles.

FIG. 2 illustrates an example of a system 200 for deploying an application according to a data access profile used to sandbox the application. The system 200 comprises a data proxy service component 206. In an example, the data proxy service component 206 comprises an operating system component of an operating system. In an example, the data proxy service component 206 may have created an online game app data access profile 210 before or during installation of an online game app. The online game app data access profile 210 may have been created based upon one or more user specified access rules specified by a user. For example, the online game app may be provided with user address book data, user email data, user gamer tag data, and/or user photo data. The online game app may not be provided with user age data and/or user location data, and thus mock age data (e.g., a mock value of "99") and/or mock location data (e.g., a mock value of "mars") are to be provided to the online game app instead of the user age data and/or the user location data.

In an example, the data proxy service component 206 may expose a deployment mock data configuration interface 202 during deployment (e.g., download, installation, etc.) of a social network app. A user may specify one or more user specified access rules for the social network app through the deployment mock data configuration interface 202. For example, the one or more user specified access rules may specify that the social network app may be allowed to access user address book data and/or user age data. The one or more user specified access rules may specify that the social network app may not be provided with user financial data, user health data, user photo data, and/or user location data, and thus mock financial data (e.g., a mock value of "is already engaged with a broker"), mock health data (e.g., a mock value of "healthy"), mock photo data (e.g., a daily image retrieved from an image sharing website), and/or mock location data (e.g., a mock value of "earth") are to be provided to the social network app instead of the user financial data, the user health data, the user photo data, and/or the user location data. In this way, the data proxy service component 206 may receive a data access profile through the deployment mock data configuration interface 202. The data proxy service component 206 may create a social network app data access profile 208 for the social network app based upon the data access profile 204. The data proxy service component 206 and/or another component (e.g., that is part of an operating system) may deploy the social network app in a sandbox mode on the device based upon the social network app data access profile 208.

Figure 3:
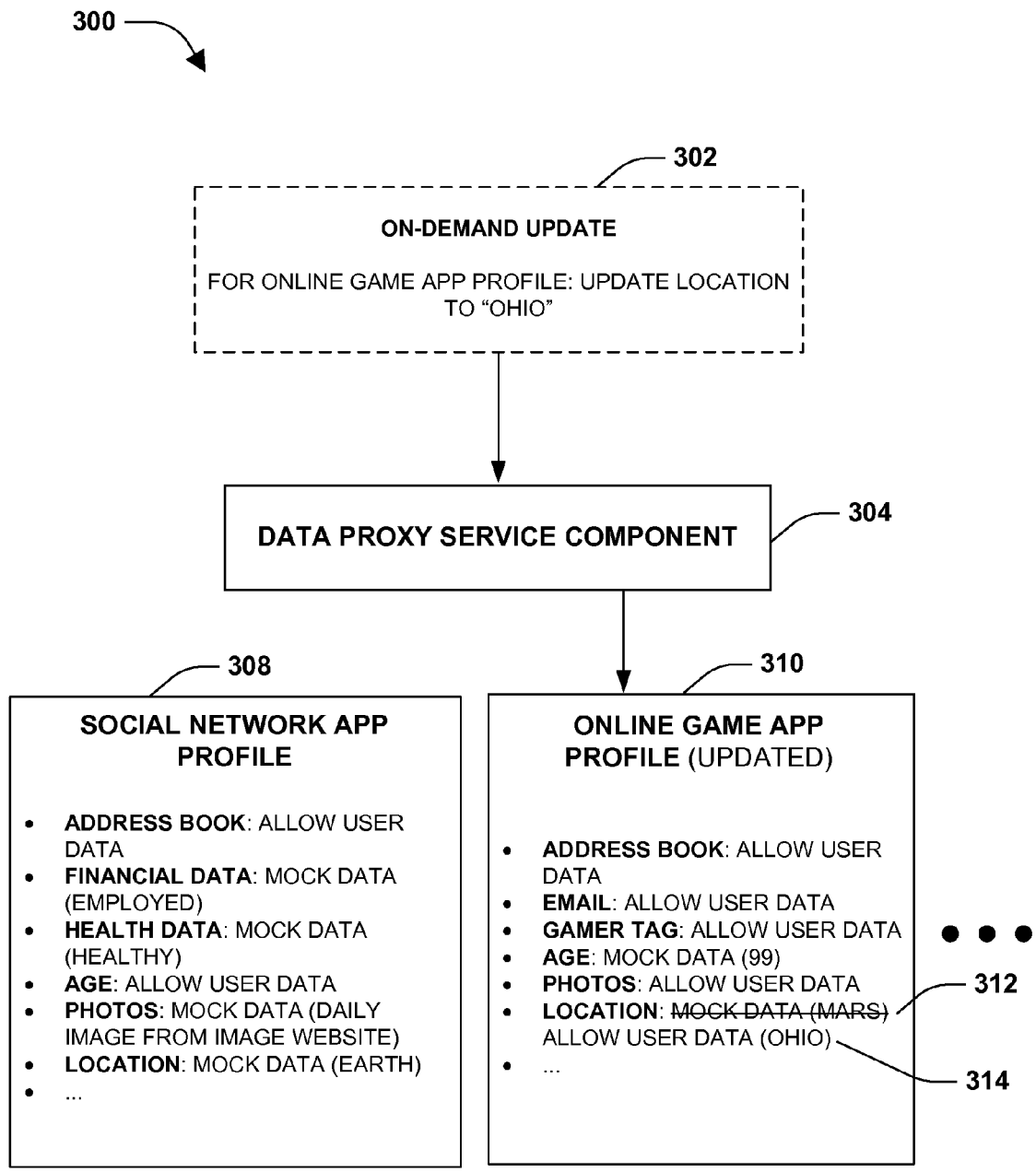
FIG. 3 is an illustration of an example of updating a data access profile for an application.

FIG. 3 illustrates an example 300 of updating a data access profile for an application. A data proxy service component 304 may maintain a social network app data access profile 308, an online game app data access profile 310, and/or other data access profiles. In an example, the data proxy service component comprises an operating system component of an operating system. In an example, the data proxy service component 304 may receive an on-demand update 302 for the online game app data access profile 310 (e.g., through a reconfiguration interface). The on-demand update 302 may specify that a user specified access rule for user location data is to change from a current rule 312 of providing mock location data (e.g., a mock value of "mars") to a new rule 314 of allowing access to user location data (e.g., a current residence of the user, such as "Ohio"). In this way, the online game app data access profile 310 may be dynamically updated or reconfigured based upon the on-demand update 302 (e.g., updated after installation of the online game app and/or during execution of the online game app).

Figure 4:
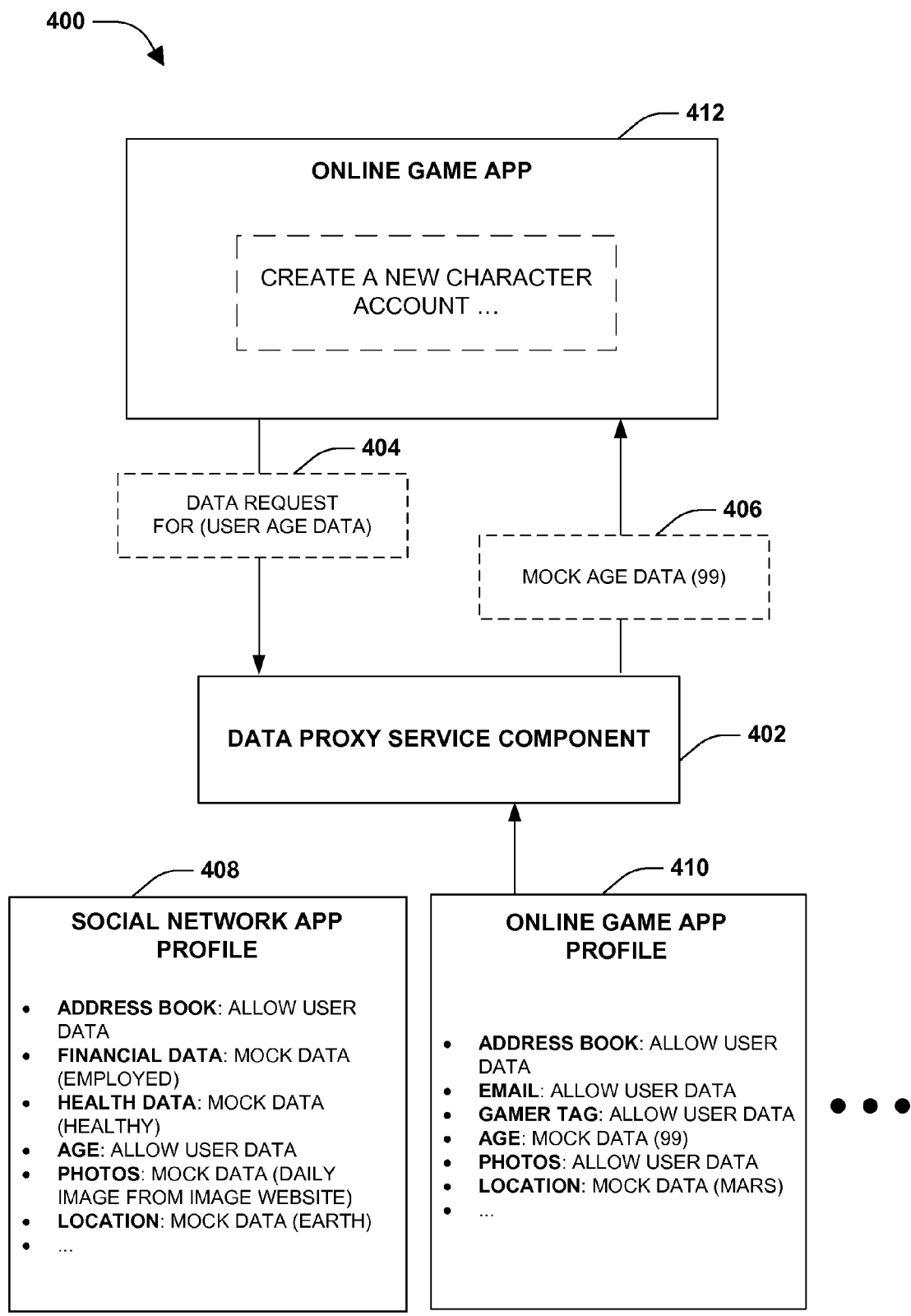
FIG. 4 is a component block diagram illustrating an exemplary system for selectively providing data to an application.

FIG. 4 illustrates an example of a system 400 for selectively providing data to an application. The system 400 may comprise a data proxy service component 402. In an example, the data proxy service component comprises an operating system component of an operating system. The data proxy service component 402 may maintain a social network app data access profile 408 for a social network app, an online game app data access profile 410 for an online game app 412, and/or other data access profiles. The data proxy service component 402 may be configured to intercept a data request 404 from the online game app 412 (e.g., the data request 404 may be in response to a user attempting to create a new character account). The data request 404 may request user age data associated with a user. The data proxy service component 402 may identify the online game app data access profile 410 for the online game app 412. The data proxy service component 402 may determine that the online game app 412 is not provided with access to the user age data, but is to be provided with mock age data 406 (e.g., a mock value of "99"). Accordingly, the data proxy service component 402 may send the mock age data 406 to the online game app 412. In this way, the online game app 412 may continue operation using the mock age data 406 because the mock age data has an age data type of the user age data, and thus the user age data may remain private.

Figure 5:
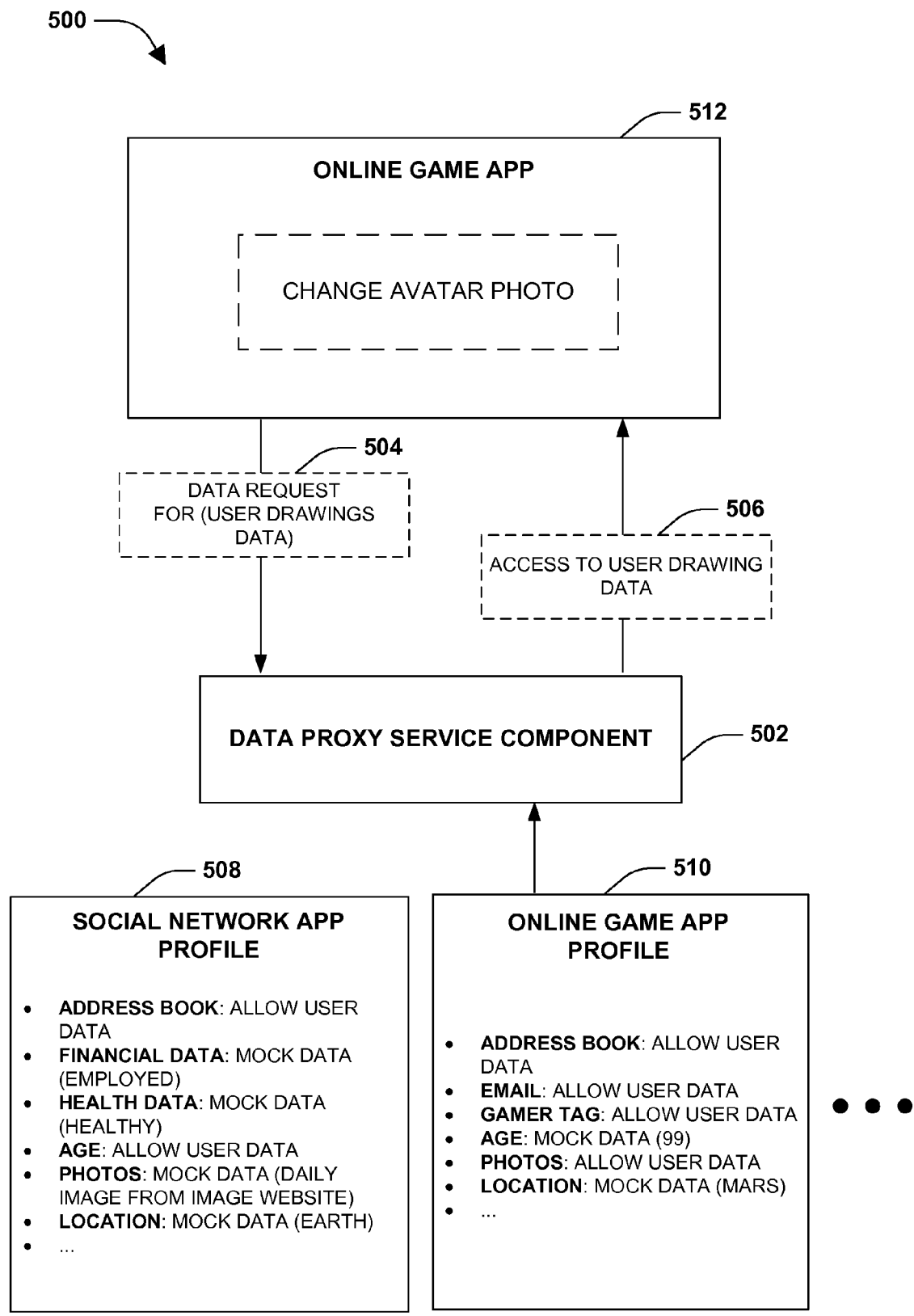
FIG. 5 is a component block diagram illustrating an exemplary system for selectively providing data to an application.

FIG. 5 illustrates an example of a system 500 for selectively providing data to an application. The system 500 may comprise a data proxy service component 502. In an example, the data proxy service component comprises an operating system component of an operating system. The data proxy service component 502 may maintain a social network app data access profile 508 for a social network app, an online game app data access profile 510 for an online game app 512, and/or other data access profiles. The data proxy service component 502 may be configured to intercept a data request 504 from the online game app 512 (e.g., the data request 504 may be in response to a user attempting to change an avatar photo). The data request 504 may request user drawing data 506 associated with a user. The data proxy service component 502 may identify the online game app data access profile 510 for the online game app 512. The data proxy service component 502 may determine that the online game app 512 is allowed to access user drawing data 506 based upon the online game app profile 510 lacking an entry for the user drawing data 506. Accordingly, the data proxy service component 502 may provide the user drawing data 506 to the online game app 512 (e.g., the data proxy service component 502 may forward the data request 504 to a drawing provider that may provide the user drawing data 506 to the online game app 512).

Figure 6:
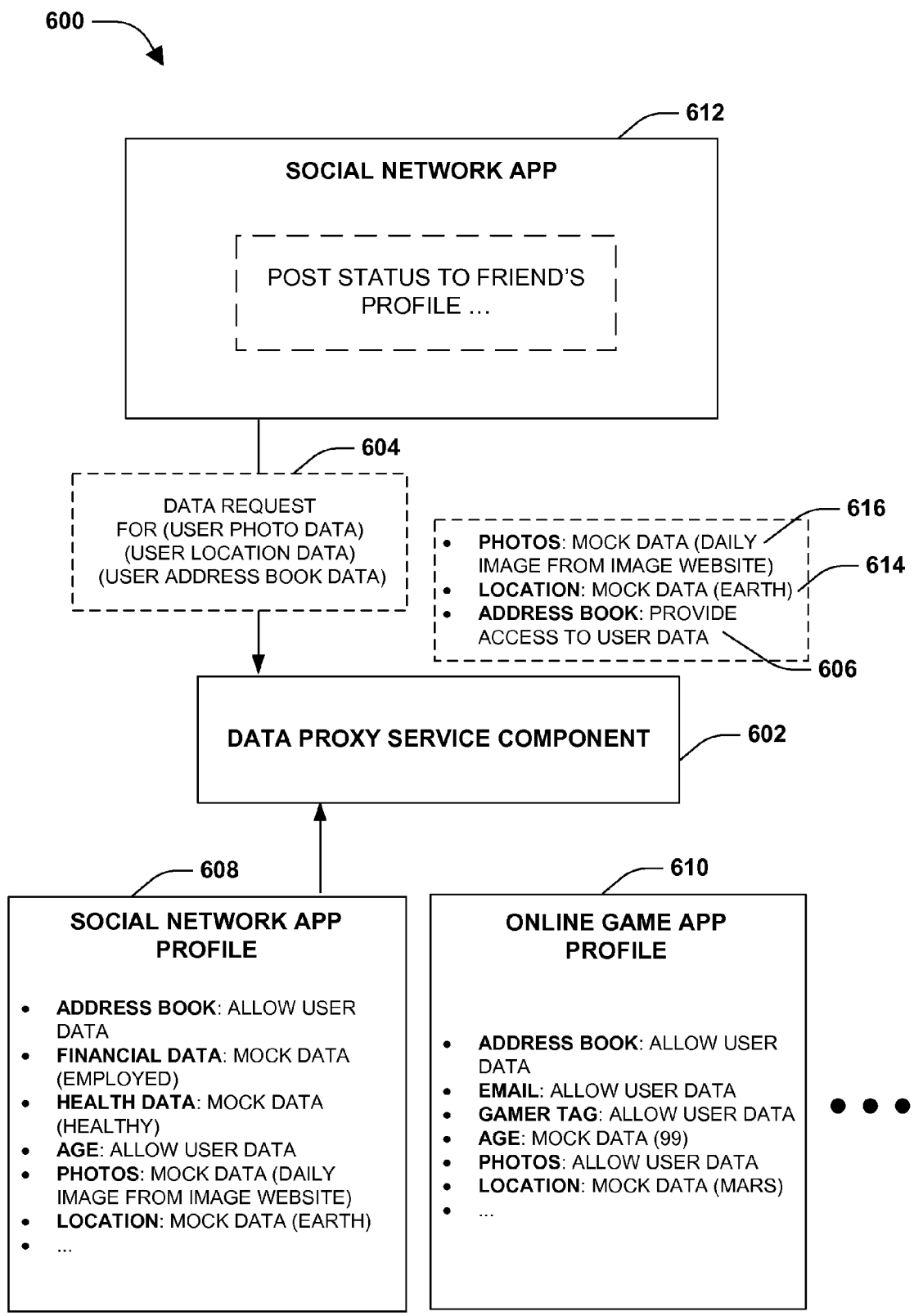
FIG. 6 is a component block diagram illustrating an exemplary system for selectively providing data to an application.

FIG. 6 illustrates an example of a system 600 for selectively providing data to an application. The system 600 may comprise a data proxy service component 602. In an example, the data proxy service component comprises an operating system component of an operating system. The data proxy service component 602 may maintain a social network app data access profile 608 for a social network app 612, an online game app data access profile 610 for an online game app, and/or other data access profiles. The data proxy service component 602 may be configured to intercept a data request 604 from the social network app 612 (e.g., the data request 604 may be in response to a user attempting to post a status to a friend's profile). The data request 604 may request user photo data, user location data, and/or user address book data 606. The data proxy service component 602 may identify the social network app data access profile 608 for the social network app 612. The data proxy service component 602 may determine that the social network app 612 is allowed to access user address book data 606. Accordingly, the data proxy service component 602 may provide the user address data 606 to the social network app 612 (e.g., the data proxy service component 602 may forward the data request 604 to an address provider that may provide the user address book data 606 to the social network app 612).

The data proxy service component 602 may determine that the social network app 612 is not allowed to access the user photo data and/or the user location data. Accordingly, the data proxy service component 602 may provide mock user photo data 616 (e.g., a mock/fake value, such as a daily image from an image sharing website) and/or mock location data 614 (e.g., a mock/fake value, such as "earth") to the social network app 612.

Figure 7:
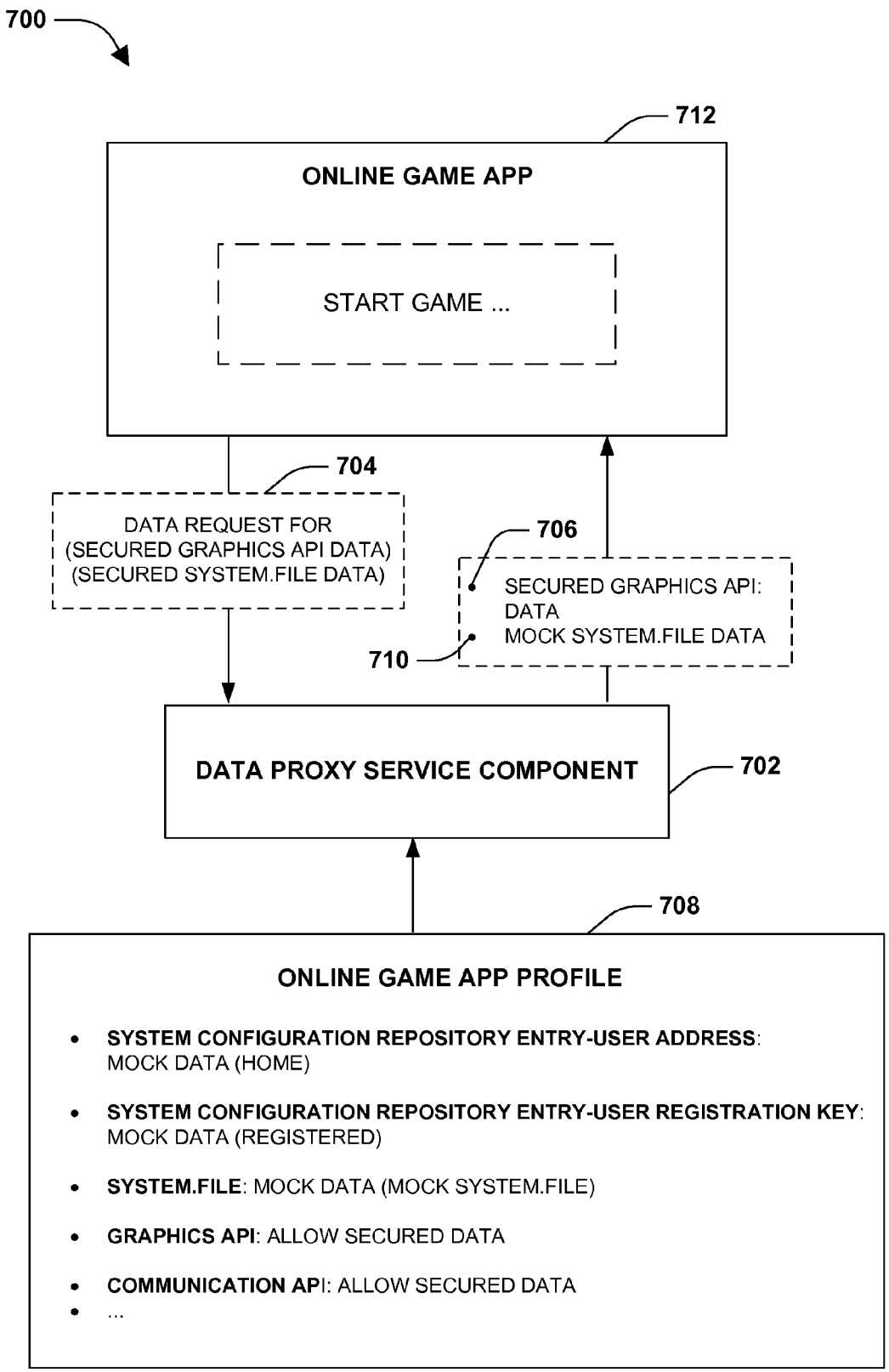
FIG. 7 is a component block diagram illustrating an exemplary system for selectively providing data to an application.

FIG. 7 illustrates an example of a system 700 for selectively providing data to an application. The system 700 may comprise a data proxy service component 702. In an example, the data proxy service component comprises an operating system component of an operating system. The data proxy service component 702 may maintain an online game app profile 708 for an online game app 712. The data proxy service component 702 may be configured to intercept a data request 704 from the online game app 712 (e.g., the data request 704 may be in response to a user attempting to start a new game through the online game app 712). The data request 704 may request secured graphics API data 706 and/or secured system.file data. The data proxy service component 702 may identify the online game app data access profile 708 for the online game app 712. The data proxy service component 702 may determine that the online game app 712 is allowed to access the secured graphics API data 706. Accordingly, the data proxy service component 702 may provide the secured graphics API data 706 to the online game app 712 (e.g., the data proxy service component 702 may forward the data request 704 to a graphics API). The data proxy service component 702 may determine that the online game app 712 is not allowed to access the secured system.file data. Accordingly, the data proxy service component 702 may provide mock system.file data to the online game app 712 (e.g., a mock system.file that is different than a secured system.file used by an operating system). In this way, system-wide protection may be provided for secured data, such as system configuration repository data, API data, access to a second application, user data maintained by the system, system object data, system component data, operating system data, file data maintained by the system, etc.

Figure 8:
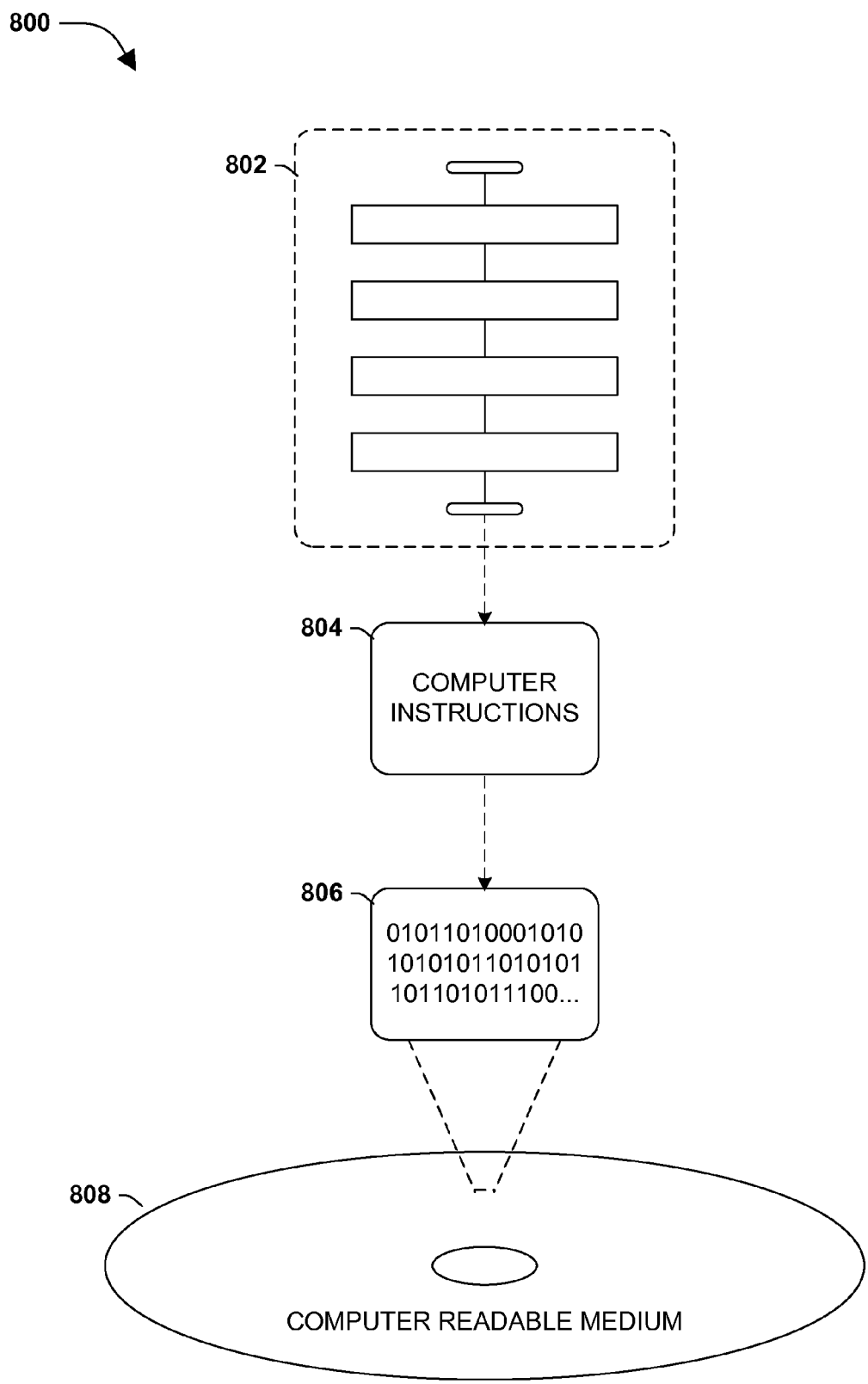
FIG. 8 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 100 of FIG. 1, for example. In some embodiments, the processor-executable instructions 804 are configured to implement a system, such as at least some of the exemplary system 200 of FIG. 2, at least some of the exemplary system 400 of FIG. 4, at least some of the exemplary system 500 of FIG. 5, at least some of the exemplary system 600 of FIG. 6, and/or at least some of the exemplary system 700 of FIG. 7, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
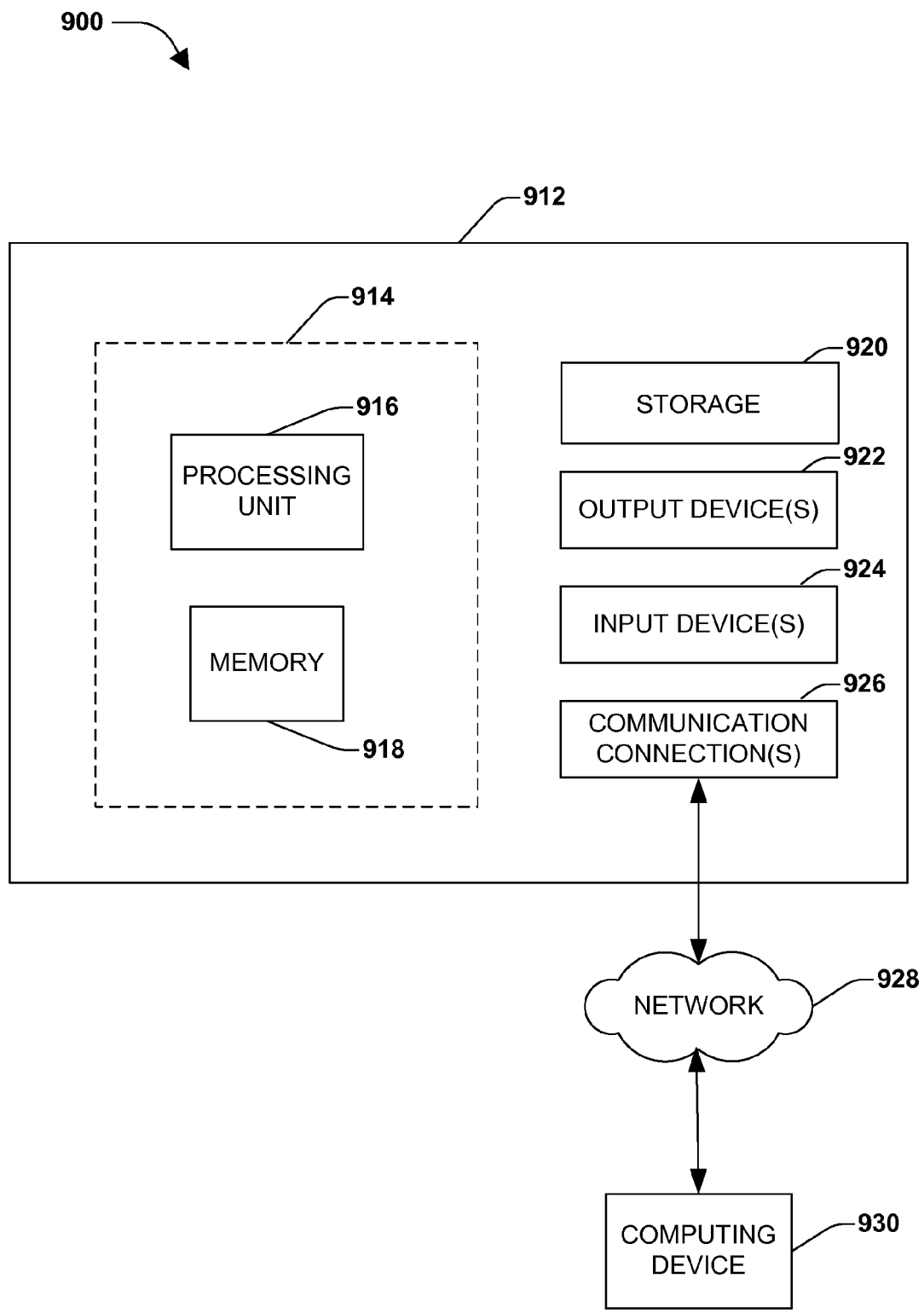
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Computer storage media does not, however, include propagated signals. Rather, computer storage media excludes propagated signals. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for deploying an application according to a data access profile used to sandbox the application, comprising:
   identifying an application for deployment on a device associated with a user;
   presenting a deployment mock data configuration interface to the user responsive to the identifying;
   before deployment of the application, receiving from the user, through the deployment mock data configuration interface, a data access profile for the application, the data access profile specifying that the application has access to a first data type of user data, that the application is blocked from accessing a second data type of user data and that the application is to receive mock data for the second data type of user data, wherein the data access profile is at least partly configured by the user; and
   deploying the application in a sandbox mode on the device based upon the data access profile.

2. The method of claim 1, the deploying comprising acquiring the application from an app store.

3. The method of claim 1, the deploying comprising installing the application on the device.

4. The method of claim 1, comprising:
   intercepting a data request from the application executing in the sandbox mode, the data request requesting access to a first user data;
   identifying the data access profile used to sandbox the application;
   responsive to determining that the first user data corresponds to the first data type, providing the application with the first user data based upon the data access profile; and
   responsive to determining that the first user data corresponds to the second data type, providing the application with a first mock data based upon the data access profile.

5. A method for selectively providing data to an application, comprising:
   presenting a deployment mock data configuration interface to a user prior to deployment of an application on a device;
   receiving a data access profile through the deployment mock data configuration interface prior to deployment of the application on the device wherein the data access profile is at least partly configured by the user;
   intercepting a data request from the application deployed on the device in a sandbox mode according to the data access profile, the data request requesting access to first user data, the data access profile specifying that the application has access to a first data type of user data, that the application is blocked from accessing a second data type of user data and that the application is to receive mock data for the second data type of user data;
   identifying the data access profile used to sandbox the application;
   responsive to determining that the first user data corresponds to the first data type, providing the application with the first user data based upon the data access profile; and
   responsive to determining that the first user data corresponds to the second data type, providing the application with first mock data based upon the data access profile.

6. The method of claim 5, comprising:
   updating the data access profile based upon user input after deployment of the application on the device.

7. The method of claim 5, the providing the application with the first user data comprising:
   forwarding the data request to a provider of the first user data.

8. The method of claim 5, the first user data comprising at least one of contact data, social network data, browsing history data, user file data, user profile data, financial data, health data, network access data, email access data, cellular access data, or subscription data.

9. The method of claim 5, the first mock data comprising data that is different than the first user data.

10. The method of claim 5, the first mock data comprising at least one of a default value or a user specified mock value.

11. The method of claim 5, the intercepting the data request comprising:
   intercepting an application programming interface (API) call comprising the data request.

12. The method of claim 5, the providing the application with first mock data comprising:
   identifying mock data having the first data type; and
   providing the mock data as the first mock data to the application.

13. A system for deploying an application according to a data access profile used to sandbox the application during deployment of the application, the system comprising:
   a data proxy service component configured to:
      identify an application for deployment on a device associated with a user;
      prior to deployment of the application, present a deployment mock data configuration interface to the user responsive to the identifying;
      receive, through the deployment mock data configuration interface, a data access profile for the application, the data access profile specifying that the application has access to a first data type of user data, that the application is blocked from accessing a second data type of user data and that the application is to receive mock data for the second data type of user data, wherein the data access profile is at least partly configured by the user; and deploy the application in a sandbox mode on the device based upon the data access profile.

14. The system of claim 13, the data proxy service component configured to:
intercept a data request from the application executing in the sandbox mode, the data request requesting access to first user data;
identify the data access profile used to sandbox the application;
responsive to determining that the first user data corresponds to the first data type, providing the application with the first user data based upon the data access profile; and
responsive to determining that the first user data corresponds to the second data type, providing the application with first mock data based upon the data access profile.

15. The system of claim 14, the data proxy service component configured to:
intercept the data request from an application programming interface (API) call.

16. The system of claim 13, the data proxy service component comprising an operating system component of an operating system.

17. The system of claim 13, the data proxy service component configured to:
forward the data request to a provider of the first user data upon determining that the first user data corresponds to the first data type.

18. The system of claim 13, the first mock data comprising data that is different than the first user data.

19. The system of claim 13, the data proxy service component configured to:
identify mock data having the first data type upon determining that the first user data corresponds to the second data type; and
provide the mock data as the first mock data to the application.

20. The method of claim 1, further comprising:
updating the data access profile based upon user input after deployment of the application on the device.

* * * * *